United States Patent Office 2,802,154
Patented Aug. 6, 1957

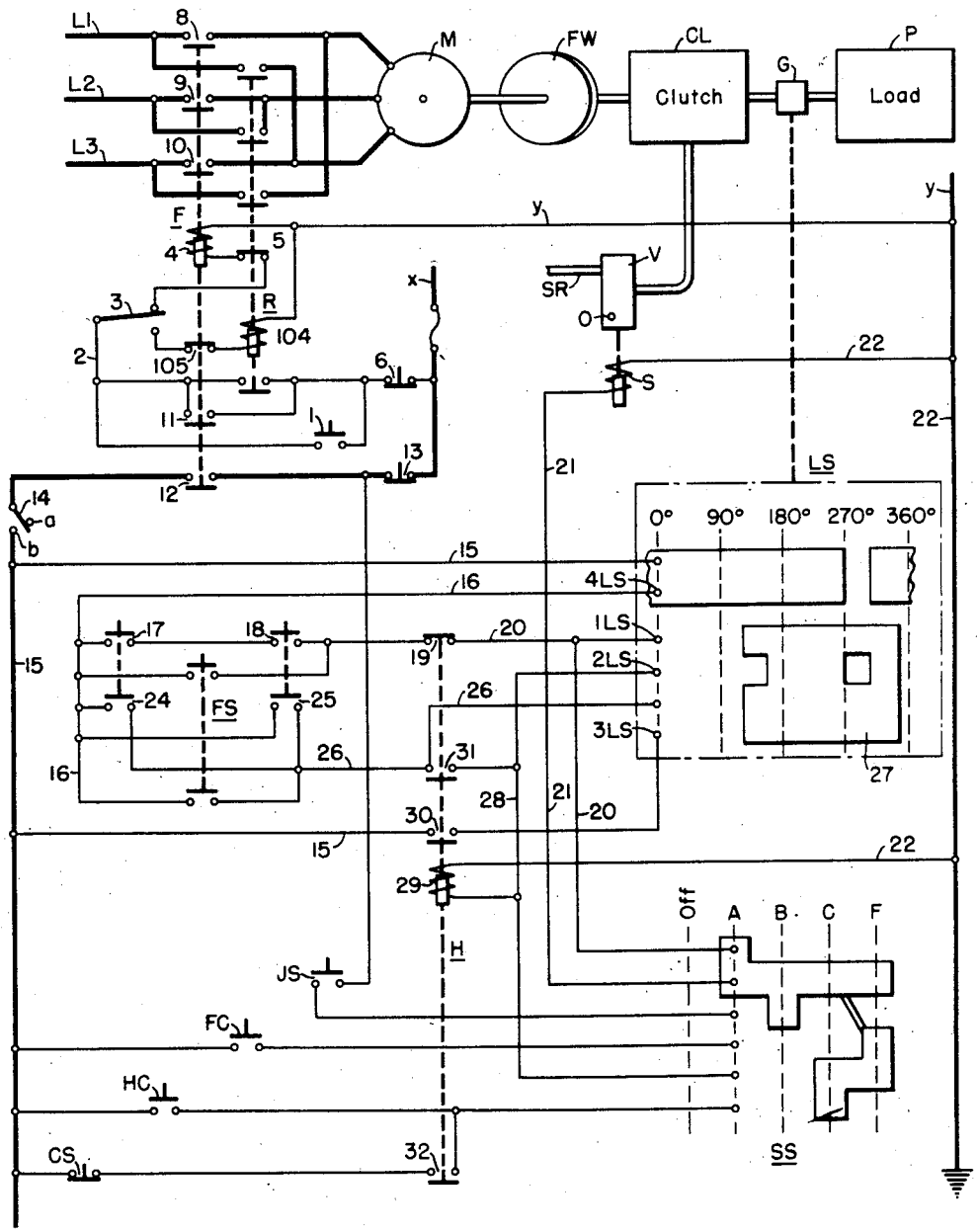

2,802,154

PRESS CONTROL

Robert P. Bonn, Williamsville, and Robert W. Egglestone, Buffalo, N. Y., assignors to Westinghouse Electric Corporation, East Pittsburgh, Pa., a corporation of Pennsylvania Application February 8, 1954, Serial No. 408,924

9 Claims. (Cl. 317—123)

Our invention relates to an electric system of control, and more particularly to a system of control for the coupling means of a prime mover coupled to a cyclically moving machine such, for example, as a power press.

Stated somewhat less broadly, our invention relates to control systems for machines, as power presses, which are operatively coupled, when operation is desired, to a continuously rotating engine, electric motor, or other prime mover. Such machines are coupled to the motor by suitably controlled clutch means to effect operation through one or more cycles and are then decoupled from the motor. Some suitable form of braking means is usually employed to stop the machine. In the description to follow, reference will be made to an electric motor, but such reference is to be considered as included within the meaning of the term motor means.

Control systems of the general type above mentioned are well known in the art, but still do not provide the maximum in safety to the operators, are still rather complicated and expensive, and do not provide the unfailing reliable operation demanded by the hazards of the operation of the machines involved.

One broad object of our invention is the provision of an improved system of control for effecting the operation of the clutch for coupling a press, or similar machine, to a continuously rotating engine, or electric motor and for decoupling the machine from the engine, or motor.

It is a more specific object of our invention to provide a system of control for a press, or similar machine, which prevents, in an improved manner, accidental unintended starting of the press from rest, and accidental unintended continuous operation of the press.

The objects stated are merely illustrative. Other objects and advantages will become more apparent from a study of the following specification and the accompanying drawing, in which:

The single figure is a diagrammatic showing of our invention as applied to a press. In the drawing P represents the load, namely a press, the operation of which is to be controlled. A limit switch mechanism LS is, through suitable transmission gears G, so coupled to the press that the limit switch mechanisms make one complete rotation of 360° for each cycle of operation of the press.

A clutch CL, which may be actuated either hydraulically or pneumatically and, when, properly actuated in one sense, couples the press and limit switch mechanisms LS to the motor M and, when actuated in another sense, decouples these machines from the motor M and brakes these machines to a stop. A heavy flywheel FW is rigidly and, for the purposes of this invention, permanently coupled to the motor shaft. The flywheel thus helps carry the load, which is extremely variable during each cycle.

The actuating fluid for the clutch CL is received from a suitable high pressure supply reservoir, here designated merely by the pipe SR. The actuating fluid, when the clutch is to couple the press to the motor, passes through the valve mechanism V to the clutch CL. This occurs in response to energization of a valve actuating electromagnetic means, namely the valve actuating solenoid S. When the solenoid is deenergized the actuating fluid exhausts through port O, and the press is decoupled from the load and suitable braking mechanisms bring the press to a quick stop. Since the brake mechanisms do not constitute part of our invention these mechanisms are not shown. It should suffice to know that when the solenoid S is energized the brake is released and the machines are coupled to the motor, and when the solenoid is deenergized the machines are decoupled from the motor and flywheel and the machines are rapidly brought to a stop by the brake mechansm. For a more detailed description of the clutch and brake mechanism used, reference may be had to U. S. Patent No. 2,999,007.

To better understand our invention we shall explain the elements and their function in conjunction with the press operation. A few brief preliminary remarks may, however, be most helpful.

In press operation it is imperative that the lubricating system be in operation, the compressor mechanisms be in operation, and the die holding slides are in proper position before any press operation is attempted. To this end switch 14 must be in the *a* position to effect such operation. The system is such that after the compressor works, the slides are positioned, and the lubricating pumps work, switch 14 can be moved to the *b* position.

To effect operation of the press, except when operating on jog, and with the selector switch in the *b* position, the motor M must first be excited, and operating at full speed. This is accomplished by depressing switch 1 whereupon a circuit is established from conductor *x* through the fuse shown then through stop switch 6, switch 1, conductor 2, switch 3, the back contacts 5 of the reverse contactor R, the actuating coil 4 of the forward contactor F, to conductor *y*. Operation of contactor F closes the contacts 8, 9, 10, 11 and 12, and opens the contacts 105 in the circuit of the actuating coil 104 of the reverse contactor. The closure of contacts 11 provides a shunt for switch 1 and contactor F thus holds itself in. The closure of contacts 12 provides potential, through switches 13 and 14, to conductor 15.

The closure of contacts 8, 9 and 10 connects the motor M to the leads L1, L2, and L3. The motor thus accelerates to full speed, for the time being operating the flywheel FW only. In normal use to operate the press the motor M operates continuously at full speed to thus make the maximum stored energy of the flywheel available to aid in driving the load when the load is coupled to the motor by the operation of the clutch CL.

When the press is to be hand-operated on single stroke with the selector switch in the position A, the attendant operates the two switches 17 and 18—one for each hand— whereupon a circuit is established from conductor 15 through the limit switch 4LS, conductor 16, switches 17 and 18, normally closed contacts 19 of the control relay H, conductor 20, selector switch section A, conductor 21, solenoid S of the electro-magnetically operated valve V, to conductor *y*. The valve V thus admits high pressure clutch actuating fluid from SR to the clutch to effect the coupling of the press L to the motor M. The press will thus start on its downward stroke. Since the limit switch mechanism is coupled to the press the conducting segments will thus begin to make their rotation with reference to the stationary contacts. In the development shown the movement is from right to left.

As long as the attendant holds one hand on switch 17 and his other hand on switch 18 the press continues its downward movement. Any time before the press has moved through about 130° to 145° of its cycle a release of either switch 17 or 18 effects the immediate stopping of the press. The purpose of requiring the operation to maintain contacts 17 and 18 closed until the press is in a given position, is to insure that the press opening has closed before the operator may remove his hands, and have the press continue to run. It is thus apparent that a considerable factor of safety has been built into our control. The attendant can not move his hands from the control position while the press is moving down and the jaws are open. After the press has completed from 72% to 80% of its down stroke the switches 17 and 18 may be released without further danger to the attendant.

After the press has made say 80% of its down stroke, the cycle of operation is completed by the operation of the control relay H. The cycle is completed without repetition and without intervention by the attendant, and the cycle of operation can be stopped only by operation of the emergency stop switch 13. How this is accomplished will become apparent presently.

After the limit switch has moved through about 130° the limit switches 1LS and 3LS close. This operation makes the energization of solenoid S independent of the normally closed contacts 19 of control relay H. The energized circuit may be traced from energized conductor 16 through either contacts 24 or 25, conductor 26, limit switch 1LS to conductor 20, selector switch section A, conductor 21, solenoid S to energized conductor 22. The purpose of the operation of the limit switches 1LS and 3LS is that it eliminates the necessity that contacts 19 and 30 overlap. This makes it possible to use a standard relay, that is no specially constructed expensive relay is needed.

At about 145° of operation limit switch 2LS closes to establish a circuit from the energized segment 27 through limit switch 2LS, conductor 28 and actuating coil 29 of the control relay H to energized conductor 22. The relay H operates to open contacts 19 and to close the normally open contacts 30, 31, and 32. The segment 27 is now energized from conductor 15 through contacts 30 independent of any other circuits. This means after the control relay H has operated properly the cycle of operation of the press will be completed regardless of the position of switches 17 and 18, and 24 and 25.

To make certain there is no repetition of the cycle even when relay H does not pull in, limit switches 4LS and 2LS open temporarily somewhere between 160° and 340° of operation. When these switches open, let us say at 270° then, if the relay H has not operated, contacts 30 and 31 will be open and contacts 19 closed. The press will thus stop. No malfunction is thus possible should relay H fail to operate. This is a very valuable safety feature.

On single stroke operation of a press it is imperative that the press does not repeat due to malfunctioning of a relay. Our control is such that if the relay H should stick closed, or if the relay failed to operate, the press would not repeat. This is a very important safety feature we provide that is not found in the control systems of the prior art. From the circuitry shown and discussed it is apparent that a short circuit which would cause relay H to close, or to remain closed when it should be open, would not cause the press to repeat. In either case contacts 19 of relay H remain open when the press cycle is completed which corresponds to the 360°, 0° position of the limit switch LS. In this limit switch position contacts 19 form part of the only energizing circuit for the solenoid S, which makes it impossible to restart the press. An open circuit or a relay coil which would not cause relay H to be actuated would also not cause a repeat. Under this condition contacts 30 remain open. Contact 30 is closed by energization of relay H when limit switch contact 2LS closes in about the 145° position of the limit switch LS. This establishes a parallel circuit branch for solenoid S which is not broken when the limit switch moves through the 270° position. The other branch for energizing solenoid S includes limit switch contacts 4LS which are opened in the 270° position. This opens the clutch and stops the press.

If the relay H operates properly then the cycle will be completed. When completed limit switches 1LS, 2LS and 3LS are opened. Segment 27 is deenergized and the press stops.

If the attendants keep switches 17 and 24, or 18 and 25 closed the control relay remains energized from energized conductor 26 through contacts 31, conductor 28, actuating coil 29 to conductor 22. The cycle of operation thus can not be repeated because contacts 19 will be open. This requires the attendant to have all his manually operable switches released at the same time to deenergize the actuating coil 29. When actuating coil 29 is deenergized contacts 19 will close and the cycle may then be repeated. Not until the attendant releases both of his switches can the cycle be repeated. This insures a single stroke operation. This single stroke feature with the use of a single control relay and other simple control is one of the important features of our invention.

Single stroke foot operation is the same as single stroke hand operation except that the foot switch FS is operated.

For jog operation the selector switch is moved to the B position whereupon the solenoid S may be energized at will by the jog switch JS.

When continuous operation of the press is desired the selector switch is moved, for continuous hand operation to position C and for continuous foot operation to position F.

If the hand-continuous switch is depressed a circuit is established from conductor 15 through switch HC, selector switch SS to conductor 28, actuating coil 29 of relay H to energized conductor 22. The relay closes contacts 32 to hold itself in through the continuous stop push button. When switch CS is operated to open this holding circuit the relay H remains energized to the end of a complete cycle of operation when the switches 1L, 2LS and 3LS make certain that relay H drops out. This is a valuable feature. When the press is to be stopped from continuous operation it is desirable that the elements stop at the top of the stroke.

While we have shown and described but a single embodiment of our invention modifications thereof are thought to be within the spirit and scope of our invention.

We claim as our invention:

1. In an electric system of control for a machine of the type including means for starting and stopping the machine in response to the energization and deenergization of electromagnetic means, in combination, a pair of power supply conductors energized, a relay having an operating coil and having one set of normally closed contacts, that are closed only when the relay is not energized and having two sets of normally open contacts, that are closed only when the relay is energized; an operator's push-button switch having first normally open contacts and second normally open contacts, electromagnetic means, a circuit for connecting said electromagnetic means to said power supply conductors, said circuit including the first normally open contacts of the push-button switch, the normally closed contacts of the relay, a conductor, and said electromagnetic means; a second circuit for connecting said relay to said power supply conductors, said second circuit including the second normally open contacts of the push-button switch, the normally open contacts of the relay, a second conductor, and the coil of said relay; and control circuit means for connecting said conductors to each other to energize the relay.

2. In an electric system of control, in combination, a pair of electric supply conductors in use energized from a suitable supply of electric energy, an electromagnetic device including a solenoid, a relay having an actuating coil and having two normally open contacts and one normally closed contact, a plurality of limit switches operable in a selected timed sequence after energization of said solenoid, a manually operable switch having two normally open contacts, first circuit means including one of the supply conductors, a first limit switch, a contact of the manually operable switch, the normally closed contact of the relay, and the solenoid to the other supply conductor; second circuit means, similarly connected to the supply conductors, including the first limit switch, the second contacts of the manually operable switch, a second limit switch, connected in parallel to a normally open contact of the relay, and the relay coil; third circuit means including a second normally open contact of the relay and a third limit switch, said third circuit means being connected in parallel to the second contacts of the manually operable switch.

3. In an electric system of control, in combination, a pair of electric supply conductors in use energized from a suitable supply of electric energy with the second conductor being grounded, an electromagnetic device including a solenoid having one of its terminals connected to the grounded conductor, a relay having an actuating coil having one of its terminals connected to the grounded conductor and having two normally open contacts and one normally closed contact, a plurality of limit switches operable in a selected timed sequence after energization of said solenoid, a manually operable switch having two normally open contacts, first circuit means including the first or ungrounded supply conductor, a first limit switch, a contact of the manully operable switch, the normally closed contact of the relay, the solenoid to the other or grounded conductor; second circuit means, similarly connected to the supply conductors, including the first limit switch, the second contacts of the manually operable switch, a second limit switch connected in parallel to a normally open contact of the contactor, and the contactor coil to the grounded conductor; third circuit means including a second normally open contact of the relay and a third limit switch; said third circuit means being connected in parallel to the second contacts of the manually operable switch from the first or ungrounded supply conductor.

4. In an electric system of control, in combination, a pair of electric supply conductors in use energized from a suitable supply of electric energy, an electromagnetic device including a solenoid, a relay having an actuating coil and having two normally open contacts and one normally closed contact, a plurailty of limit switches operable in a selected timed sequence after energization of said solenoid, a manually operable switch having two normally open contacts, first circuit means including one of the supply conductors, a first limit switch, a contact of the manually operable switch, the normally closed contact of the relay, and the solenoid to the other conductor; second circuit means, similarly connected to the supply conductors, including the first limit switch, the second contacts of the manually operable switch, a second limit switch connected in parallel to a normally open contact of the relay, and the relay coil, third circuit means including a second normally open contact of the relay and a third limit switch; said third circuit means being connected in parallel to the second contacts of the manually operable switch from the first supply conductor, and a fourth limit switch for connecting the third circuit means to the junction between the normally closed contact of the relay and the solenoid.

5. In an electric system of control, in combination, a pair of electric supply conductors in use energized from a suitable supply of electric energy with the second conductor being grounded, an electromagnetic device including a solenoid having one of its terminals connected to the grounded conductor, a relay having an actuating coil having one of its terminals connected to the grounded conductor and having two normally open contacts and one normally closed contact, a plurality of limit switches operable in a selected timed sequence after energization of said solenoid, a manually operable switch having two normally open contacts, first circuit means including the first or ungrounded supply conductor, a first limit switch, a contact of the manually operable switch, the normally closed contact of the relay, the solenoid to the other or grounded conductor, second circuit means, similarly connected to the supply conductors, including the first limit switch, the second contacts of the manually operable switch, a second limit switch connected in parallel to a normally open contact of the relay, and the relay coil to the grounded conductor, third circuit means including a second normally open contact of the relay and a third limit switch, said third circuit means being connected in parallel to the second contacts of the manually operable switch from the first or ungrounded conductor, and a fourth limit switch for connecting the third circuit means to the junction between the normally closed contact of the contactor and the solenoid.

6. In an electric system of control, in combination, a pair of electric supply conductors in use energized from a suitable supply of electric energy, an electromagnetic device including a solenoid, a relay contactor having an actuating coil and having two normally open contacts and one normally closed contact, a plurality of limit switches operable in a selected timed sequence after energization of said solenoid, a manually operable switch having two normally open contacts, first circuit means including the first supply conductor, a first limit switch, a contact of the manually operable switch, the normally closed contact of the relay, and the solenoid to the other supply conductor; second circuit means, similarly connected to the supply conductors, including the first limit switch, the second contacts of the manually operable switch, a second limit switch connected in parallel to a normally open contact of the relay, and the relay coil; third circuit means including a second normally open contact of the relay and a third limit switch, said third circuit means being connected in parallel to the second contacts of the manually operable switch from the first supply conductor, and means set in operation by the initial energization of the solenoid for effecting the closing of said third and fourth limit switches after the solenoid has been energized for about forty percent of the selected period of energization, for effecting the closing of the second limit switch after the solenoid has been energized for about forty-five percent of its selected period of energization, for effecting the opening and reclosing of the first and second limit switches while the energization of the solenoid passes from the seventy percent to eighty percent of its selected period of energization, and for opening the second, third and fourth limit switches when the selected period of energization is completed.

7. In an electric system of control, in combination, a pair of electric supply conductors in use energized from a suitable supply of electric energy with the second conductor being grounded, an electromagnetic device including a solenoid having one of its terminals connected to the grounded conductor, a relay having an actuating coil having one of its terminals connected to the grounded conductor and having two normally open contacts and one normally closed contact, a plurality of limit switches operable in a selected timed sequence after energization of said solenoid, a manually operable switch having two make contacts, first circuit means including the first or ungrounded conductor, a first limit switch, a contact of the manually operable switch, the normally closed contact of the contactor, and the solenoid to the other or grounded conductor; second circuit means, similarly connected to the conductors, including the first limit switch, the second contacts of the manually operable switch, a second limit switch connected in parallel to a normally open contact of the relay, and the contactor coil to the grounded conductor, third circuit means including a second normally open contact of the relay and a third limit switch, said third circuit means being connected in parallel to the second contacts of the manually operable switch from the first or ungrounded conductor, and means set in operation by the initial energization of the solenoid for effecting the closing of said third and fourth limit switches after the solenoid has been energized for about forty percent of its selected period of energization, for effecting the closing of the second limit switch after the solenoid has been energized for about forty-five percent of its selected period of energization, for effecting the opening and reclosing of the first and second limit switches while the energization of the solenoid passes from the seventy percent to eighty percent of its selected period of energization, and for opening the second, third and fourth limit switches when the selected period of energization is completed.

8. In an electric system of control, in combination, a pair of electric supply conductors in use energized from a suitable supply of electric energy, an electromagnetic device including a solenoid, a relay having an actuating coil and having two normally open contacts and one normally closed contact, a plurality of limit switches operable in a selected timed sequence after energization of said solenoid, a manually operable switch having two normally open contacts, first circuit means including the first supply conductor, a first limit switch, a contact of the manually operable switch, the normally closed contact of the relay, and the solenoid to the other supply conductor, second circuit means, similarly connected to the supply conductors, including the first limit switch, the second contacts of the manually operable switch, a second limit switch connected in parallel to a normally open contact of the relay, and the contactor coil; third circuit means including a second normally open contact of the relay and a third limit switch; said third circuit means being connected in parallel to the second contacts of the manually operable switch from the first supply conductor, and a fourth limit switch for connecting the third circuit means to the junction between the normally closed contact of the relay and the solenoid, and means set in operation by the initial energization of the solenoid for effecting the closing of said third and fourth limit switches after the solenoid has been energized for about forty percent of its selected period of energization, for effecting the closing of the second limit switch after the solenoid has been energized for about forty-five percent of its selected period of energization, for effecting the opening and reclosing of the first and second limit switches while the energization of the solenoid passes from the seventy percent to eighty percent of its selected period of energization, and for opening the second, third and fourth limit switches when the selected period of energization is completed.

9. In an electric system of control, in combination, a pair of electric supply conductors in use energized from a suitable supply of electric energy with the second conductor being grounded, an electromagnetic device including a solenoid having one of its terminals connected to the grounded conductor, a relay having an actuating coil having one of its terminals connected to the grounded conductor and having two normally open contacts and one normally closed contact, a plurality of limit switches operable in a selected timed sequence after energization of said solenoid, a manually operable switch having two normally open contacts, first circuit means including the first or ungrounded conductor, a first limit switch, a contact of the manually operable switch, and the normally closed contact of the relay, the solenoid to the other or grounded conductor; second circuit means, similarly connected to the supply conductors, including the first limit switch, the second contacts of the manually operable switch, a second limit switch connected in parallel to a normally open contact of the relay, and the relay coil to the grounded conductor, third circuit means including a second normally open contact of the relay and a third limit switch, said third circuit means being connected in parallel to the second contacts of the manually operable switch from the first or ungrounded conductor, and a fourth limit switch for connecting the third circuit means to the junction between the normally closed contact of the relay and the solenoid, and means set in operation by the initial energization of the solenoid for effecting the closing of said third and fourth limit switches after the solenoid has been energized for about forty percent of its selected period of energization, for effecting the closing of the second limit switch after the solenoid has been energized for about forty-five percent of its selected period of energization, for effecting the opening and reclosing of the first and second limit switches while the energization of the solenoid passes from the seventy percent to eighty percent of its selected period of energization, and for opening the second, third, and fourth limit switches when the selected period of energization is completed.

References Cited in the file of this patent
UNITED STATES PATENTS

| | | |
|---|---|---|
| 1,993,413 | Mellon | Mar. 5, 1935 |
| 2,302,838 | Bundy | Nov. 24, 1942 |
| 2,630,467 | Winther | Mar. 3, 1953 |